(12) United States Patent
Miner et al.

(10) Patent No.: US 11,819,164 B2
(45) Date of Patent: Nov. 21, 2023

(54) BASTING COVER APPARATUS AND METHOD THEREOF

(71) Applicant: North Atlantic Imports, LLC, Logan, UT (US)

(72) Inventors: James P. Miner, Preston, ID (US); Mauricio J. Escobedo, Logan, UT (US)

(73) Assignee: North Atlantic Imports, LLC, Logan, UT (US)

( * ) Notice: Subject to any disclaimer, the term of this patent is extended or adjusted under 35 U.S.C. 154(b) by 0 days.

(21) Appl. No.: 17/537,166

(22) Filed: Nov. 29, 2021

(65) Prior Publication Data

US 2022/0167796 A1     Jun. 2, 2022

Related U.S. Application Data

(60) Provisional application No. 63/119,564, filed on Nov. 30, 2020.

(51) Int. Cl.
*A47J 43/00* (2006.01)
*A47J 36/06* (2006.01)
*A23L 5/10* (2016.01)

(52) U.S. Cl.
CPC .............. *A47J 43/005* (2022.01); *A23L 5/13* (2016.08); *A47J 36/06* (2013.01); *A23V 2002/00* (2013.01)

(58) Field of Classification Search
CPC .............................. A47J 43/005; A47J 37/106
USPC .... 220/666, 212.5, 759, 761, 769, 630, 628; 206/218
See application file for complete search history.

(56) References Cited

U.S. PATENT DOCUMENTS

| | | |
|---|---|---|
| 4,000,830 A | 1/1977 | French |
| 5,195,500 A | 3/1993 | Lerner |
| 5,555,994 A | 9/1996 | Chen |
| 6,758,131 B1 | 7/2004 | Joubert |
| 7,001,627 B2 | 2/2006 | Marson |
| 7,997,188 B2 | 8/2011 | Umali |
| 8,317,046 B2 | 11/2012 | Vanderberg et al. |
| 8,424,699 B2 | 4/2013 | Vanderberg et al. |

(Continued)

OTHER PUBLICATIONS

American Metalcraft, Basting Cover, [online] Nov. 13, 2008, retrieved Dec. 17, 2022. Retrieved from the Internet: URL:<https://www.webstaurantstore.com/american-metalcraft-ba1040s-10-1-4-round-stainless-steel-basting-cover/124BA1040S.html>.*

(Continued)

*Primary Examiner* — Drew E Becker
*Assistant Examiner* — Chaim A Smith
(74) *Attorney, Agent, or Firm* — David L. Stott

(57) ABSTRACT

A basting cover for maintaining a humid environment for a food product. The basting cover includes a wall, a rigid band, and a flexible handle. The wall extends with a central wall portion and a side wall portion, the central wall portion having an external surface, the side wall portion extending outward from the central wall portion to a free end. Further, the side wall portion extends with thinned portions defined therein to facilitate the side wall portion to be moveable between an expanded use position and a collapsed storage position. The rigid band extends along a central wall periphery. The flexible handle is coupled to the central wall portion such that the flexible handle is disposed in a space between an outer edge of the rigid band and the external surface of the central wall portion.

20 Claims, 3 Drawing Sheets

(56) References Cited

U.S. PATENT DOCUMENTS

| | | |
|---|---|---|
| 8,424,708 B2 | 4/2013 | Vanderberg et al. |
| 8,469,225 B2 | 6/2013 | Fredland |
| 8,881,644 B1 | 11/2014 | Scro, II |
| 8,887,949 B2 | 11/2014 | Tuan |
| 9,079,685 B2 | 7/2015 | Sudakoff |
| 9,409,677 B2 | 8/2016 | Sudakoff |
| 9,451,849 B2 | 9/2016 | Howard |
| 9,669,557 B2 | 6/2017 | Golomb |
| 10,058,210 B2 | 8/2018 | Palermo |
| 10,264,921 B2 | 4/2019 | Bennett |
| 10,464,711 B2 | 11/2019 | Tsui |
| 10,486,859 B2 | 11/2019 | Sudakoff |
| 2004/0105917 A1* | 6/2004 | Mannion ............ B65D 81/3869<br>426/110 |
| 2008/0099476 A1* | 5/2008 | Fung ..................... B65D 15/16<br>220/6 |

OTHER PUBLICATIONS

Tovolo Collapsible Cover, Amazon.com, [online] Mar. 27, 2007, retrieved Dec. 27, 2022. Retrieved from the Internet: URL:Amazon.com: Tovolo Vented Collapsible Medium Microwave Cover (Charcoal)—Splatter Guard & Colander Kitchen Gadget for Food & Meal Prep / Dishwasher-Safe, BPA-Free Silicone & Plastic : Home & Kitchen.*

* cited by examiner

BASTING COVER APPARATUS AND METHOD THEREOF

CROSS-REFERENCE TO RELATED APPLICATIONS

This application claims the benefit of U.S. Provisional Application No. 63/119,564, filed Nov. 30, 2020, the disclosure of which is hereby incorporated by reference herein in its entirety.

TECHNICAL FIELD

The present invention relates generally to food preparation devices and, more specifically, the present invention relates to devices to be positioned over a flat cooking surface to provide a humid environment or the like over a food product.

BACKGROUND

The process of basting and keeping a food product moist, such as meat or the like, has been employed by use of ovens, enclosed metal dishes and manually pouring juices over the food product. However, the use of an oven or further equipment may not be available. This is particularly true in outdoor settings, such as camping, tailgating or the like, where equipment and space are minimal. Further, without an oven or an enclosed heat source, it becomes difficult to properly heat and baste the food product, particularly when the heat source is a flat open cooking surface or the like. Moreover, it is becoming more desirable to have the ability to cook food products using different methods, such as basting, when outdoors. Additionally, cookware used for basting traditionally is large and bulky, and the storage space for outdoor cooking stations is typically limited.

BRIEF SUMMARY OF THE INVENTION

The present invention is directed to various embodiments of a basting cover configured to maintain a humid environment for a food product upon the cover being positioned over a flat cooking surface. The basting cover includes a central wall, a side wall, and a flexible handle. The central wall extends to define a central wall periphery and an external surface. The side wall extends from a first end to a second end, the first end being adjacently fixed to the central wall and extending outward from the central wall to the second end. The side wall is a flexible material such that the side wall is adjustable relative to the central wall between an expanded use position and a collapsed storage position. Upon the side wall being in the expanded use position, the second end is positionable directly on the flat cooking surface so that the side wall and central wall extends to define a dome configuration with the external surface facing upward, and upon the side wall being in the collapsed storage position, the side wall folds at least twice along a length of the side wall. With this arrangement, the flexible handle extends along the external surface of the central wall.

In another embodiment, the basting cover further includes a rigid band, the rigid band continuously extending along and being coupled adjacent to the central wall periphery, the rigid band being more rigid than the side wall. In another embodiment, the flexible handle extends between oppositely facing inner sides of the rigid band. In still another embodiment, the rigid band extends with an outer edge such that the flexible handle is positioned in a space defined between the outer edge of the rigid band and the exterior surface of the central wall. In another embodiment, the rigid band is a separate structure from the side wall and the central wall, the side wall and the central wall being a monolithic, seamless structure.

In another embodiment, the side wall extends at least partially with a radial component. In another embodiment, the central wall extends with a generally flat structure. In still another embodiment, the side wall and the central wall are formed of a polymeric material. In yet another embodiment, the side wall and the central wall are a monolithic, seamless structure. In another embodiment, the side wall and the central wall are integrally formed to each other.

In accordance with another embodiment of the present invention, a basting cover configured to maintain a humid environment for a food product upon the cover being positioned over a flat cooking surface is provided. The basting cover includes a wall, a rigid band, and a flexible handle. The wall extends with a central wall portion and a side wall portion, the central wall portion having an external surface. The side wall portion extends outward from the central wall portion to a free end, the side wall portion having thinned portions defined therein to facilitate the side wall portion to be moveable between an expanded use position and a collapsed storage position. The rigid band extending along and coupled adjacent to a central wall periphery. The flexible handle extending along the central wall portion such that the flexible handle is disposed in a space between an outer edge of the rigid band and the external surface of the central wall portion.

In another embodiment, the rigid band is positioned within a groove defined in the external surface of the central wall portion and along the central wall periphery. In another embodiment, wherein, in the expanded use position, the wall extends to exhibit a dome configuration, and wherein, in the collapsed storage position, the side wall portion folds with at least two folds along a length of the side wall portion. In another embodiment, the central wall portion and the side wall portion are a monolithic, seamless structure. In another embodiment, the rigid band is sized and configured to support the central wall portion upon moving the side wall portion between the expanded use position and collapsed storage position. In still another embodiment, the central wall portion extends with a generally flat structure. In another embodiment, the central wall portion and the rigid band exhibit a generally square profile.

In accordance with another embodiment of the present invention, a method of cooking a food product on a flat cooking surface is provided. The method includes the steps of: providing a basting cover having a central wall portion and a side wall portion, the central wall portion having an external surface, the side wall portion extending outward from the central wall portion to a free end such that the basting cover exhibits a dome configuration, the side wall portion having thinned portions defined therein to facilitate the side wall portion to be moveable between an expanded use position and a collapsed storage position, the basting cover having a rigid band coupled to the central wall portion so that the rigid band extends from the central wall portion to an outer edge, the basting cover having a flexible handle disposed in a space between the outer edge of the rigid band and the central wall portion; cooking the food product on the flat cooking surface of a griddle type cooking station; and positioning the basting cover over at least some of the food product so that the free end of the basting cover sits directly against the flat cooking surface.

In another embodiment, the method further includes lifting the basting cover from the flat cooking surface with the flexible handle to insert moisture over the food product and re-positioning the basting cover over the food product on the flat cooking surface. In another embodiment, the method further includes moving the basting cover from the collapsed storage position prior to positioning the basting cover over the flat cooking surface. In another embodiment, the method further includes positioning the basting dome with the outer edge of the rigid band sitting directly onto a flat surface so that the basting dome is oriented with a bowl type configuration such that the basting dome is configured to receive a food product therein.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Figure 1:
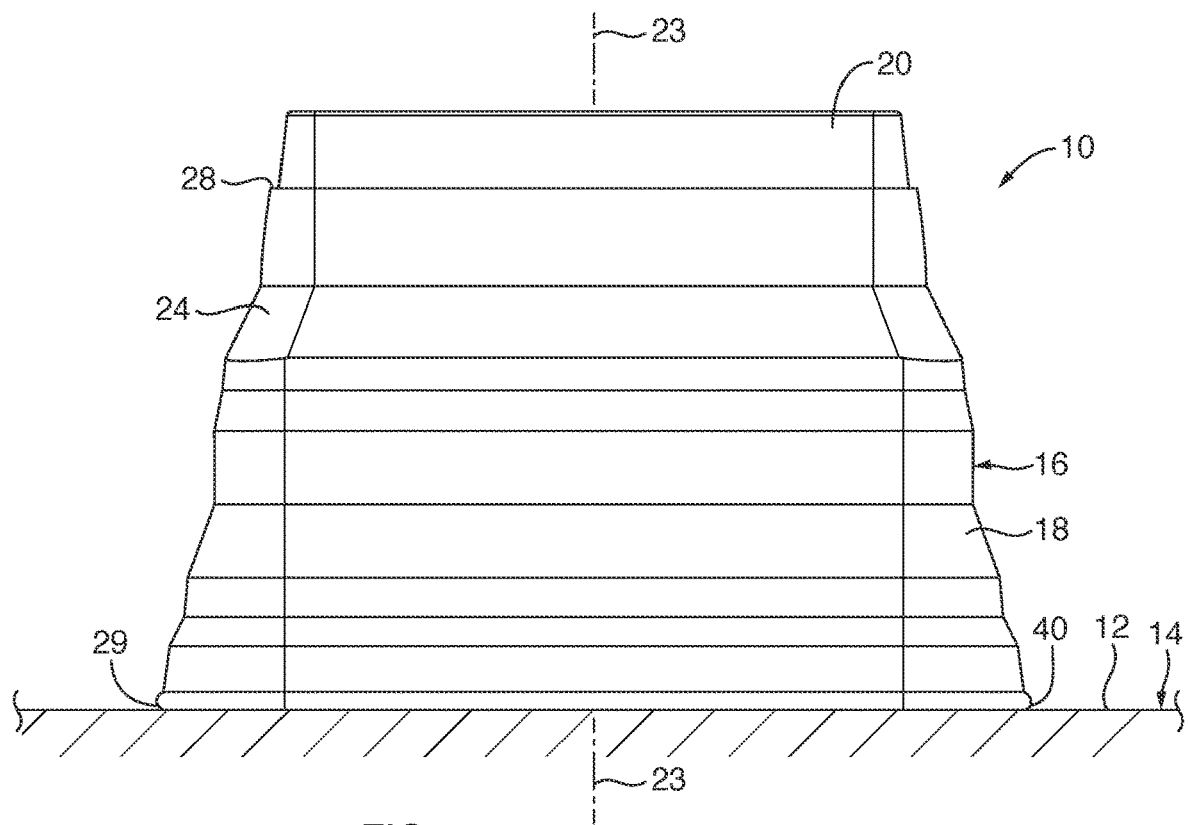
FIG. 1 is a side view of a basting cover in an expanded use position, depicting the basting cover positioned on a flat cooking surface, according to an embodiment of the present invention.
Figure 2:
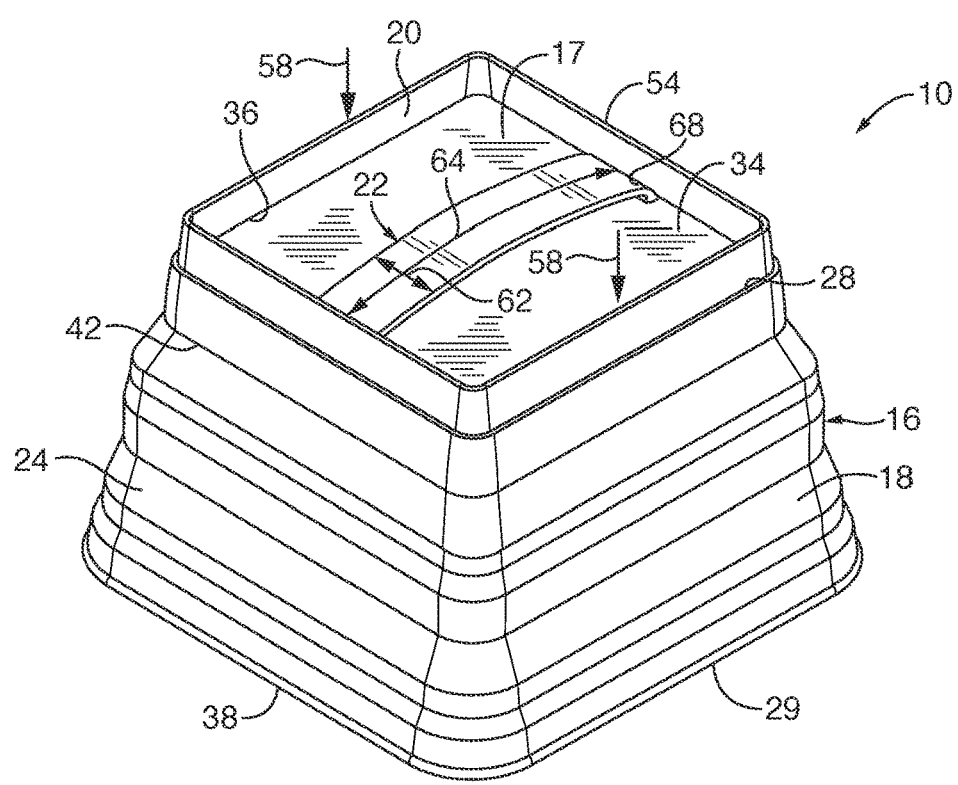
FIG. 2 is a perspective view of the basting cover of FIG. 1, depicting the basting cover having a handle, according to another embodiment of the present invention.
Figure 3:
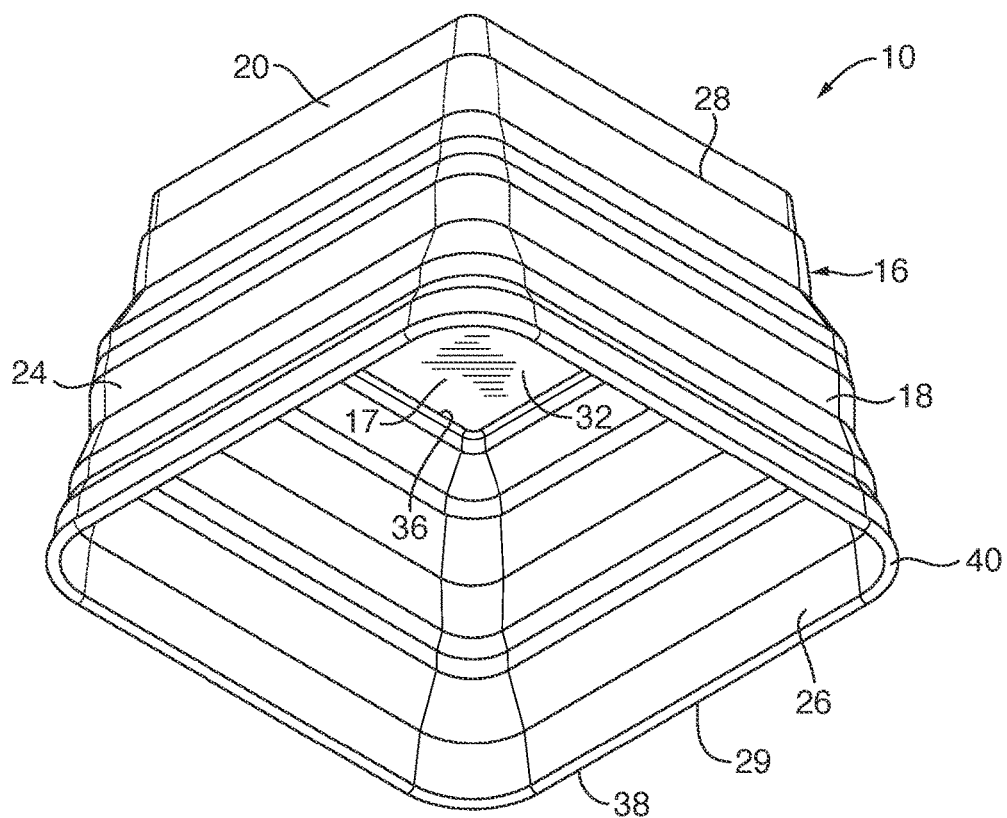
FIG. 3 is a bottom perspective view of the basting cover of FIG. 1, according to another embodiment of the present invention.

Referring to FIGS. 1 and 2, a basting cover 10 sized and configured to be placed over a flat cooking surface 12 is provided. Such basting cover 10 may be placed over food, such as meat or vegetables or any other suitable food product, being cooked or heated on the flat cooking surface 12 to generate a humid environment for the food product. Typically, the basting cover 10 may be employed as an accessory component for an outdoor cooking station (not shown) of the type that can heat a griddle 14, the flat cooking surface 12 being the cooking surface of the griddle 14. The basting cover 10 may be moveable between a collapsed storage position (see FIG. 7) and an expanded use position. The expanded use position may be referenced as an extended use position. In the use position, the basting cover 10 may be employed for generating a humid environment, as discussed above, or the basting cover 10 may be inverted to be employed as a bowl for holding, for example, a salad or the cooked food product, or any other type of food product. In this manner, the basting cover may be an accessory component to assist the user while cooking as well as being moveable to a compact collapsed position for storage purposes.

Figures 4, 5:
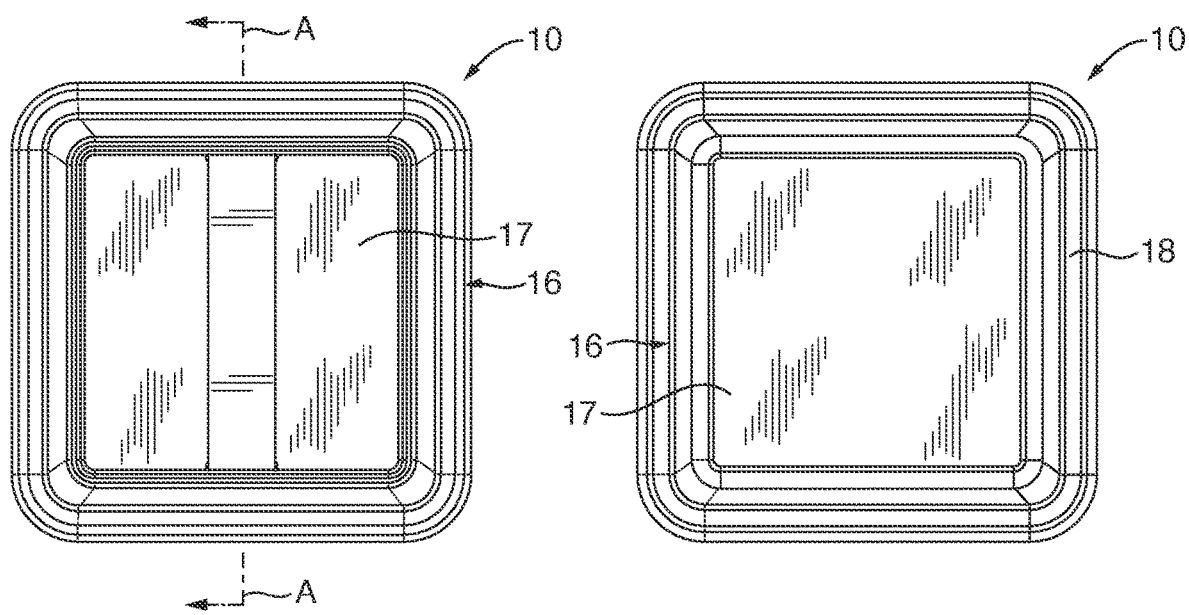
FIG. 4 is a top view of the basting cover of FIG. 1, according to another embodiment of the present invention.
FIG. 5 is a bottom view of the basting cover of FIG. 1, according to another embodiment of the present invention.

With reference to FIGS. 1-5, the basting cover 10 may extend to exhibit a dome-like configuration. In one embodiment, the basting cover 10 may exhibit a generally square profile, as depicted in FIGS. 4 and 5. In another embodiment, the dome-like configuration of the basting cover 10 may extend with the generally square profile relative to a top or bottom view. In still another embodiment, the basting cover may include a wall 16 extending to define the dome-like configuration, the wall extending as a seamless, monolithic structure. Such wall 16 may extend to define a central wall 17 and a side wall 18, the side wall 18 extending outward from the central wall 17 to define the dome-like configuration. The wall 16 may be formed of a polymeric material that may be flexible, deformable, or elastomeric, such as silicon rubber or neoprene rubber or any other suitable flexible polymeric material that can be positioned directly on a hot cooking surface. Further, the wall may be formed by employing molding techniques or the like, as known by one of ordinary skill in the art. In another embodiment, the side wall 18 may extend with multiple side walls each extending from the central wall 17. In a further embodiment, the multiple side walls may define a radial component between adjacent ones of the multiple side walls. In another embodiment, the side wall 18 may extend at least partially radially so as to exhibit a radial component. In another embodiment, the side wall 18 is moveable such that the side wall 18 is not a fixed structure such that the side wall can be moved to multiple configurations. In another embodiment, the basting cover 10 may be moved to multiple configurations such that the basting cover is not a fixed structure.

Now with reference to FIGS. 1-3 and 6, in another embodiment, the basting cover 10 may include the wall 18, a rigid band 20, and a flexible handle 22. The basting cover 10 may extend to define an axis 23 extending centrally through the central wall 17 such that the side wall 18 may extend outward or radially relative to the axis 23. The side wall 18 of the wall 16 may extend to define an external surface 24 and an internal surface 26. The side wall 18 may extend between a first end 28 and a second end 29, the second end 29 being a free end of the basting cover 10. The first end 28 may be fixed to or integrally extend from the central wall 17. Further, the first end 28 or first end portion of the side wall 18 may define a groove 30 or notch therein, the groove 30 or notch sized and configured to receive the rigid band 20.

The central wall 17 may extend with a central wall internal surface 32 and a central wall external surface 34 to define a central wall periphery 36 therebetween. The side wall 18 and central wall periphery 36, as well as the central wall 17, may be a monolithic seamless structure. Further, the side wall 18 may extend down and outward from the first end 28 to the second end 29 such that the second end 29 may extend as a free end 38 and may be open so as to extend as a continuous loop. Further, the second end 29 may extend to define a rounded edge 40 or lip structure. The rounded edge 40 may extend at least partially around a wire-like structure 41, such as stainless steel, for example. Such lip structure or rounded edge 40 may substantially provide a seal with the flat cooking surface 12 as the basting cover 10 is placed over food to create the humid environment thereunder, as previously set forth. Further, the rounded edge 40 may extend along the length or entire extent of the free end or second end of the side wall 18. The wire-like structure 41 may be encapsulated within the side wall 18 adjacent the second end 29 of the side wall 18. In other words, the wire-like structure 41 may be embedded within the lip structure. Further, the wire-like structure 41 may provide a degree of stiffness to the second end of the side wall 18, the stiffness being greater than the stiffness of the material of the side wall 18. In this manner, the wire-like structure 41 may provide support to the side wall 18 of the basting cover 10.

Figure 6:
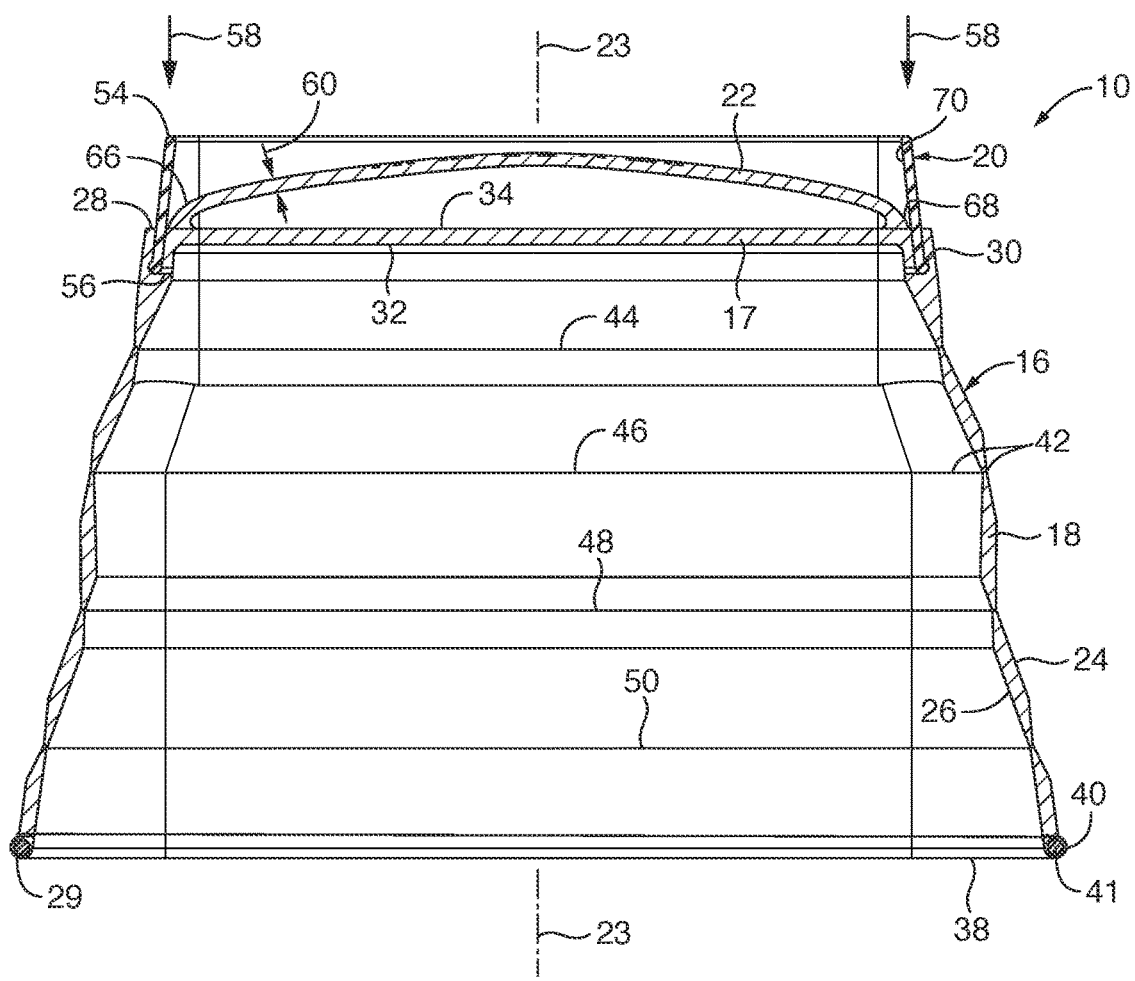
FIG. 6 is a cross-sectional view of the basting cover taken along section line A-A of FIG. 4, according to another embodiment of the present invention.
Figure 7:
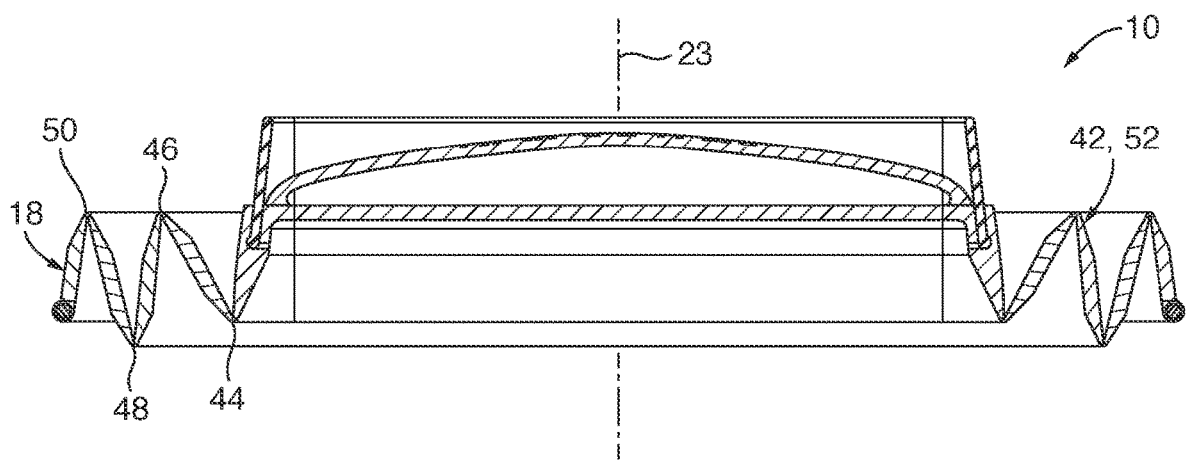
FIG. 7 is a cross-sectional view of the basting cover, depicting the basting cover in a collapsed storage position, according to another embodiment of the present invention.

With reference to FIGS. 2, 6 and 7, as previously set forth, the basting cover 10 may be moveable between the expanded use position and the collapsible storage position. The side wall 18 may define thinned portions 42 or indentations such that, upon the basting cover 10 being in the expanded use position, the thinned portions 42 may extend laterally along the side wall 18 relative to the axis 23. In another embodiment, the thinned portions 42 may extend linearly along portions of the side wall 18 and may extend laterally relative to the axis 23 of the basting cover 10. In another embodiment, the thinned portions 42 defined in the side wall 18 may extend as multiple loop extending indents or looped indents, the multiple looped indents may each extend parallel relative to each other and extend laterally relative to the axis 23 defined by the basting cover 10. For example, between the first and second ends 28, 29 of the side wall 18, the multiple looped indents may include a first looped indent 44, a second looped indent 46, a third looped indent 48, and a fourth looped indent 50. Each of the looped indents may extend parallel relative to any other one of the looped indents defined in the side wall 18 of the basting cover 10. Such looped indents defined in the basting cover 10 facilitate manually moving the basting cover 10 between the expanded use position and the collapsible storage position. In other words, the thinned portions 42 or looped indents may be where folds 52 (see FIG. 7) occur along the side wall 18 upon moving the basting cover 10 from the expanded use position to the collapsible storage position.

With reference to FIGS. 2 and 6, as previously set forth, the basting cover 10 may include the rigid band 20. The rigid band may be sized and configured to be positioned and secured within the notch or groove 30 defined in the side wall 18 adjacent the first end 28 of the side wall 18 such that the rigid band 20 may extend continuously along the central wall periphery 36 of the central wall. As such, the rigid band 20 may continuously extend along the central wall periphery 36 with a loop configuration. Upon the rigid band 20 being secured or fixed in the groove 30 and along the central wall periphery 36, the rigid band 20 may extend to define an outer edge 54 or top edge and a bottom edge 56. The outer edge 54 of the rigid band 20 may extend above the central wall periphery 36 and the bottom edge 56 of the rigid band 20 may extend below the central wall periphery 36 so as to extend within the groove 30 or notch defined in the wall 16 of the basting cover 10. The rigid band 20 may be shaped to correspond with a top-view profile of the basting cover 10. In one embodiment, the rigid band 20 may extend with a generally square profile. Further, the rigid band 20 may be sized and configured to support and maintain the central wall 17 in a generally flat orientation so as to support the central wall 17 as a base component of the side wall 18. Further the rigid band 20 may be sized and configured to cooperate with the side wall 18 such that, upon a force being placed upon the rigid band 20, as shown by arrow 58, the rigid band 20 assists in controllably collapsing the side wall 18 along the looped indents or thinned portion 42 to create the folds 52 (FIG. 7) to move the basting cover to the storage position. Such force 58 may be in placed upon the rigid band in a direction similar to, consistent with, or as a component, extending generally parallel with the axis 23, extending centrally through the basting dome 10. The rigid band 20 may be made of a polymeric material, such as nylon, or any other durable rigid polymeric material known in the art that may be suitable and safe to use as an accessory cooking component.

Further, as previously set forth, the basting cover 10 may include a flexible handle 22. In one embodiment, the flexible handle 22 may be an elongated structure with a thickness 60 and a width 62 extending consistently along a length 64 of the elongated structure, the width 62 being larger than the thickness 60 of the flexible handle 22. The length 64 may be larger than the width 62 and may be about a similar distance between opposite sides of the central wall periphery 36. Such flexible handle 22 may extend between a first handle end 66 and an opposite second handle end 68, the first and second handle ends 66, 68 located and coupled adjacent the first end 28 of the side wall 18 and may extend across opposite sides of the external surface 34 of the central wall 17 to the central wall periphery 36. The flexible handle 22 may be fixed 50 between opposite sides of the central wall periphery 36 so as to be fixated below the outer edge 54 of the rigid band 20. The outer edge 54 of the rigid band may be the top most edge or outer most edge of the basting cover 10 such that the flexible handle 22 may be positioned within a space 70 between the outer edge 54 and the external surface 34 of the central wall 17. In this manner, upon the basting cover 10 being used as a bowl such that the outer edge 54 of the rigid band 20 is positioned onto a flat surface, such as a counter top or table, the flexible handle 22 may reside within the space 70 and not interfere with the engagement and positioning of the outer edge 54 relative to the flat surface so that the basting cover 10, while being used as a bowl, may sit level relative to the flat surface. Further, upon the basting cover 10 being employed for keeping food warm and moist on the flat cooking surface 12, such as a griddle, the flexible handle 22 can readily be grasped by the user to either remove the basting cover 10 from the flat cooking surface 12 or to position the basting cover 10 over food being cooked, as desired. Further, the flexible handle 22 may be integrally formed to the central wall 17 and may be formed of the same material as the wall 16 of basting cover 10. In another embodiment, the flexible handle 22 may be formed as a separate and discrete component from the central wall 17, and coupled to a top side of the basting cover 10. In another embodiment, the flexible handle 22 may be a non-rigid structure.

With reference to FIGS. 2, 6 and 7, as previously set forth, the basting cover 10 may be moved to the collapsed storage position. In the storage position, the size of the basting cover 10 may be minimized or compacted to a generally flattened shape such that the side wall 18 may be moved to exhibit the folds 52 in the side wall 18. In one embodiment, the side wall 18 may be collapsed to extend with at least two folds 52 to be moved to the storage position. In another embodiment, the side wall 18 may be collapsed to extend with at least three folds 52, and in another embodiment, the side wall 18 may be collapsed to extend with at least four folds 52 to be moved to the storage position. As previously set forth, such folds 52 occur along the looped indents or thinned portions 42 defined in the side wall 18. Upon the basting cover being moved to the storage position, the rigid band 20 may extend above the collapsed side wall 18 with a portion of the rigid band 20 being disposed between opposing sides of the folds 52 of the side wall 18. In the storage position, the rigid band 20 may extend with a height above the folds 52 of the side wall such that the height of the rigid band may be similar to or slightly smaller than a height of the folds 52 of the side wall. In this manner, the basting cover 10 may be collapsed in size to minimize the footprint of the basting cover 10 and, thus, make the basting cover 10 more suitable for storage as desired by the user.

Now with reference to FIGS. 1, 2, 6 and 7, the basting cover 10 used as an accessory component for cooking will now be described. For example, in one embodiment, upon cooking food product on the griddle 14 of the cooking station, the basting cover 10, as described herein, may be positioned over at least some of the food product so that the free end of the basting cover 10 sits directly against the flat cooking surface 12. As previously set forth, the basting cover 10 may be manually moved between the expanded use position and the collapsed storage position such that the basting cover 10 includes the rigid band 20 with the outer edge 54 and such that the basting cover 10 includes the flexible handle 22 positioned within the space 70 defined by the rigid band 20 between the outer edge 54 and the wall 16 of the basting cover 10. Further, in another embodiment, the basting cover 10 may be lifted from the flat cooking surface 12 with the flexible handle 22 to insert moisture over the food product and then the basting cover 10 may be re-positioned over the food product on the flat cooking surface 12. In this manner, the dome configuration of the basting cover 10 may assist in maintaining humidity within the dome configuration and around the food product under the basting cover 10. In another embodiment, the basting cover 10 may be moved from the collapsed storage position to the expanded use position prior to, for example, positioning the basting cover 10 over the flat cooking surface 12 for generating the humid environment under the basting cover. Similarly, subsequent to cooking food, the basting cover 10 may be placed in storage, in which the basting cover may be minimized in size by manually moving the basting cover 10 from the expanded use position to the collapsed storage position. In another embodiment, at any time prior to or after cooking the food product, the basting cover 10 may be inverted so that the outer edge 54 of the rigid band 20 may be positioned directly on a flat surface, such as a counter top or table, so that the basting dome 10 is oriented with a bowl type configuration such that the basting dome 10 is configured to receive food product therein, such as the previously cooked food or a salad or the like.

While the invention may be susceptible to various modifications and alternative forms, specific embodiments have been shown by way of example in the drawings and have been described in detail herein. Further, the structural features of any one embodiment disclosed herein may be combined or replaced by any one of the structural features of another embodiment set forth herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. A basting cover configured to maintain a humid environment for a food product upon the cover being positioned over a flat cooking surface, comprising:
    a central wall extending to define a central wall periphery and an external surface;
    a side wall extending from a first end to a second end, the first end being adjacently fixed to the central wall and extending outward from the central wall to the second end, the second end being a side wall free end, the side wall being a flexible material such that the side wall is adjustable relative to the central wall between an expanded use position and a collapsed storage position, wherein, upon the side wall being in the expanded use position, the side wall free end extends to define an opening and is positionable directly on the flat cooking surface so that the side wall and central wall extends to define a dome configuration with the external surface facing upward, and wherein, upon the side wall being in the collapsed storage position, the side wall folds at least twice along a length of the side wall;
    a flexible handle having a length extending between a handle first fixed end and a handle second fixed end such that the flexible handle extends along the external surface of the central wall; and
    a rigid extension positioned along the central wall periphery and the external surface of the central wall, the rigid extension extending a depth from the central wall to a rigid free end such that the length of the flexible handle is positioned to maintain an upright arcuately extending structure so as to always remain within a space defined by the depth of the rigid extension between the central wall and the rigid free end.

2. The basting cover of claim 1, wherein the rigid extension extends continuously along the central wall periphery, the rigid extension being more rigid than the side wall.

3. The basting cover of claim 1, wherein the flexible handle extends between oppositely facing inner sides of the rigid extension.

4. The basting cover of claim 1, wherein the rigid extension is a separate structure from the side wall and the central wall, the side wall and the central wall being a monolithic, seamless structure.

5. The basting cover of claim 1, wherein the side wall extends at least partially with a radial component.

6. The basting cover of claim 1, wherein the central wall extends with a generally flat structure.

7. The basting cover of claim 1, wherein the side wall and the central wall are formed of a polymeric material.

8. The basting cover of claim 1, wherein the side wall and the central wall are a monolithic, seamless structure.

9. The basting cover of claim 1, wherein the side wall and the central wall are integrally formed to each other.

10. The basting cover of claim 1, wherein the rigid extension and the side wall extend from the central wall in generally opposite directions.

11. A basting cover configured to maintain a humid environment for a food product upon the cover being positioned over a flat cooking surface, comprising:
    a wall extending with a central wall portion and a side wall portion, the central wall portion having an external surface, the side wall portion extending outward from the central wall portion to a side wall free end, the side wall portion having thinned portions defined therein to facilitate the side wall portion to be moveable between an expanded use position and a collapsed storage position;
    a rigid band extending along and coupled adjacent to a central wall periphery of the central wall portion, the rigid band extending outward a depth from the central wall to a rigid free end; and
    a flexible handle having a length extending between a handle first fixed end and a handle second fixed end such that the flexible handle extends along the central wall portion and such that the length of the flexible handle is positioned to maintain an upright arcuately extending structure so as to always remain within in a space defined within the depth of the rigid band between the rigid free end of the rigid band and the external surface of the central wall portion.

12. The basting cover of claim 11, wherein, in the expanded use position, the wall extends to exhibit a dome configuration, and wherein, in the collapsed storage position, the side wall portion folds with at least two folds along a length of the side wall portion.

13. The basting cover of claim 11, wherein the central wall portion and the side wall portion are a monolithic, seamless structure.

14. The basting cover of claim 11, wherein the rigid band is sized and configured to support the central wall portion upon moving the side wall portion between the expanded use position and collapsed storage position.

15. The basting cover of claim 11, wherein the central wall portion extends with a generally flat structure.

16. The basting cover of claim 11, wherein the central wall portion and the rigid band exhibit a generally square profile.

17. A method of cooking a food product on a flat cooking surface, comprising:

providing a basting cover having a central wall portion and a side wall portion, the central wall portion having an external surface, the side wall portion extending outward from the central wall portion to a free end such that the basting cover exhibits a dome configuration, the side wall portion having thinned portions defined therein to facilitate the side wall portion to be moveable between an expanded use position and a collapsed storage position, the basting cover having a rigid extension extending away from and coupled to the central wall portion so that the rigid extension extends from the central wall portion to a rigid extension free end, the basting cover having a flexible handle that is positioned maintain an upright arcuately extending structure so as to remain entirely within a space defined between the rigid extension free end of the rigid extension and the central wall portion;

cooking the food product on the flat cooking surface of a griddle type cooking station; and positioning the basting cover over at least some of the food product so that the free end of the basting cover sits directly against the flat cooking surface.

18. The method according to claim 17, further comprising lifting the basting cover from the flat cooking surface with the flexible handle to insert moisture over the food product and re-positioning the basting cover over the food product on the flat cooking surface.

19. The method according to claim 17, further comprising moving the basting cover from the collapsed storage position prior to positioning the basting cover over the flat cooking surface.

20. The method according to claim 17, further comprising positioning the basting cover with the rigid extension free end of the rigid extension sitting directly onto a flat surface so that the basting cover is oriented with a bowl type configuration such that the basting cover is configured to receive a food product therein.

* * * * *